United States Patent [19]

Igoe

[11] 4,169,854

[45] * Oct. 2, 1979

[54] DIRECT ACIDIFIED YOGURT

[75] Inventor: Robert S. Igoe, San Diego, Calif.

[73] Assignee: Merck & Co., Inc., Rahway, N.J.

[*] Notice: The portion of the term of this patent subsequent to Nov. 15, 1994, has been disclaimed.

[21] Appl. No.: 796,251

[22] Filed: May 12, 1977

[51] Int. Cl.² .................. A23C 9/10; A23C 23/00
[52] U.S. Cl. ........................ 426/583; 426/573; 426/578; 426/522
[58] Field of Search ............ 426/573, 575, 578, 579, 426/583, 522

[56] References Cited

U.S. PATENT DOCUMENTS

| | | | |
|---|---|---|---|
| 3,539,363 | 11/1970 | Morgan et al. | 426/522 X |
| 3,692,532 | 9/1972 | Shenkenberg et al. | 426/599 X |
| 3,721,571 | 3/1973 | Glicksman et al. | 426/579 |
| 3,726,690 | 10/1973 | Schuppner | 426/583 X |
| 3,917,875 | 11/1975 | Gardiner | 426/583 X |
| 3,955,009 | 5/1976 | Eskritt et al. | 426/583 X |
| 3,996,390 | 12/1976 | Igoe | 426/583 X |
| 4,058,636 | 11/1977 | Igoe | 426/573 |

FOREIGN PATENT DOCUMENTS 45-40259 12/1970 Japan.

OTHER PUBLICATIONS

Reddy et al., B–Complex Vitamins in Cultured and Acidified Yogurt, J. Dairy Sci., vol. 59, No. 2, 1976 (pp. 191-195).

Litchfield, J. H., Replace Bacteria in Making Sour Cream, Buttermilk, Food Processing, 1964 (pp. 130-132).

Gelled Products of Stabilized Sour Milk–Produced Using Low-Methoxylated Pectin, Carragheenin or Furcellaran as Gelling Agent, Derwent Abstract, 54317w/33, 1975.

*Primary Examiner*—David M. Naff
*Attorney, Agent, or Firm*—Gabriel Lopez; Julian S. Levitt; Donald J. Perrella

[57] ABSTRACT

A direct acidified yogurt is prepared from milk, a thickener blend containing starch, sodium carboxymethyl cellulose, xanthan gum and locust bean gum, and optionally a carbohydrate sweetener. To prepare yogurt, the thickener blend is mixed with milk, the mixture is pasteurized, an acidulent is added and the acidified mixture is subjected to a shearing treatment to produce a yogurt-like texture.

8 Claims, No Drawings

DIRECT ACIDIFIED YOGURT

BACKGROUND OF THE INVENTION

The preparation of yogurt traditionally is accomplished by bacterial fermentation. Such a process is inherently time consuming and requires careful control for commercial success.

OBJECTS OF THE INVENTION

It is, accordingly, an object of the present invention to provide a process for preparing yogurt which does not require bacterial fermentation. Another object is to provide a fast, simple and foolproof process for preparing yogurt. A further object is to provide a direct acidified yogurt. Still another object is to provide a novel thickener system for preparing a direct acidified yogurt. These and other objects of the present invention will be apparent from the following description.

SUMMARY OF THE INVENTION

A direct acidified yogurt is obtained by treating a formulation comprising from about 80 to about 98 parts by weight milk, from about 0.5 to about 1.2 parts by weight acidulent, and from about 1.8 to about 4.5 parts by weight of thickener blend, and optionally up to about 18 parts by weight of a carbohydrate sweetener. The thickener blend contains from about 40 to about 80 parts by weight starch, from about 20 to about 45 parts by weight of sodium carboxymethyl cellulose (CMC), from about 3 to about 8 parts by weight xanthan gum, and from about 0.7 to about 3 parts by weight locust bean gum.

DETAILED DESCRIPTION

It has been found that a direct acidified yogurt can be obtained from milk, acidulent, and a thickener blend of specific ingredients in specific ratios. Sugar may be added, if desired, for taste considerations.

The direct acidified yogurt of the present invention may be prepared using whole milk, reconstituted non-fat dry milk solids, or non-fat dry milk solids and water.

The acidulent may be any common food acid such as, for example, citric, tartaric, acetic, malic, lactic, fumaric, ascorbic, adipic, succinic, oxalic, and phosphoric acids.

The optional carbohydrate sweetener may be sucrose, fructose, lactose, maltose, invert sugar, glucose, corn syrup solids having a dextrose equivalent of at least about 28, and the like.

The direct acidified yogurt of the present invention has the following composition:

| Ingredient | Parts by Weight |
| --- | --- |
| Milk | 80–98 |
| Carbohydrate Sweetener | 0–18 |
| Acidulent | 0.5–1.2 |
| Thickener Blend | 1.8–4.5 |

The thickener blend contains starch, CMC, xanthan gum, and locust bean gum. The starch may be any starch which is stable at a low pH. Examples of such starches are waxy maize starch and tapioca starch. The CMC preferably has a degree of substitution of from about 0.65 to about 0.95, and most preferably from about 0.7 to about 0.9. The xanthan gum is food grade xanthan gum and the locust bean gum is food grade locust bean gum. The thickener blend has the following composition:

| Ingredient | Parts by Weight |
| --- | --- |
| Starch | 40–80 |
| CMC | 20–45 |
| Xanthan gum | 3.0–8.0 |
| Locust bean gum | 0.7–3.0 |

The direct acidified yogurt of the present invention is prepared by adding the thickener blend to the milk, or if a carbohydrate sweetener is used, adding a mix of the thickener blend and carbohydrate sweetener to the milk, with moderate agitation. The resulting liquid is then subjected to pasteurization treatment after which acidulent (and flavor if any) are added with vigorous agitation, followed by shearing treatment, typically single stage homogenization at from about 5 to about 45 atmospheres. The resulting product is then packaged and cooled.

The following examples illustrate the present invention without, however, limiting the same thereto.

EXAMPLE 1

A thickener blend is prepared by blending the following:

|  | % | Grams |
| --- | --- | --- |
| Waxy maize starch | 64.3 | 18 |
| CMC | 28.6 | 8 |
| Xanthan gum | 5.7 | 1.6 |
| Locust bean gum | 1.4 | 0.4 |
|  | 100.0% | 28 |

The foregoing blend is then mixed with 74 g sugar and added to 890 g milk. The resulting liquid is heated at 160° F. (71° C.) for 30 minutes. It is then removed from heat and 8.0 g of citric acid added with mechanical stirring. It is then passed through a single stage homogenizer at 350 psi, packaged and cooled. The resulting product has a tender delicate gel with a body and consistency resembling that of a cultured yogurt.

EXAMPLE 2

The procedure of Example 1 is repeated except using the following levels of ingredients:

|  | Grams |
| --- | --- |
| Milk | 820 |
| Sugar | 154 |
| Citric acid | 6 |
| Thickener blend | 20 |

A product similar to that of Example 1 is obtained.

EXAMPLE 3

The procedure of Example 1 is repeated except using the following levels of ingredients:

|  | Grams |
| --- | --- |
| Milk | 950 |
| Citric Acid | 10 |
| Thickener blend | 40 |

A product similar to that of Example 1 is obtained but with a more tart, less sweet taste.

EXAMPLE 4

The procedure of Example 1 is repeated except using a thickener blend having the following composition:

|  | % |
| --- | --- |
| Waxy maize starch | 50.5 |
| CMC | 40.4 |
| Xanthan gum | 7.6 |
| Locust bean gum | 1.5 |

The resulting product has a delicate gel structure but with less body and consistency than the product of Example 1.

EXAMPLE 5

The procedure of Example 1 is repeated except using a thickener blend having the following composition:

|  | % |
| --- | --- |
| Waxy maize starch | 70 |
| CMC | 24 |
| Xanthan gum | 5.0 |
| Locust bean gum | 1.0 |

The resulting product has a firmer gel structure than that of Example 1 and a heavier body and consistency.

What is claimed is:

1. A composition for preparing a direct acidified yogurt which before acidulation consists essentially of from about 80 to about 98 parts by weight milk, from about 1.8 to about 4.5 parts by weight of thickener blend the thickener blend consisting essentially of from about 40 to about 80 parts by weight starch which is stable at low pH, from about 20 to about 45 parts by weight sodium carboxymethyl cellulose, from about 3.0 to about 8.0 parts by weight xanthan gum and from about 0.7 to about 3.0 parts by weight locust bean gum.

2. A composition according to claim 1 wherein the starch in the thickener blend is waxy maize starch or tapioca starch.

3. A composition according to claim 1 which contains up to about 18 parts by weight of carbohydrate sweetener.

4. A thickener blend for use in preparing a direct acidified yogurt consisting essentially of from about 40 to about 80 parts by weight of starch which is stable at low pH, from about 20 to about 45 parts by weight sodium carboxymethyl cellulose, from about 3.0 to about 8.0 parts by weight xanthan gum and from about 0.7 to about 3.0 parts by weight locust bean gum.

5. A thickener blend according to claim 4 wherein the starch in the thickener blend is waxy maize starch or tapioca starch.

6. A method of preparing a direct acidified yogurt which comprises mixing from about 1.8 to about 4.5 parts of a thickener blend according to claim 4 with from about 80 to about 98 parts by weight milk, pasteurizing the mixture, adding from about 0.5 to about 1.2 parts by weight acidulent and shearing the pasteurized product to produce a yogurt-like texture.

7. A method according to claim 6 wherein the shearing is effected by homogenization at from about 5 to about 45 atmospheres.

8. A method according to claim 6 wherein the mixture before pasteurization contains up to about 18 parts by weight of carbohydrate sweetener.

* * * * *